July 6, 1954  H. G. HAAS  2,683,249
EXCITATION SYSTEM FOR ALTERNATING CURRENT GENERATORS
Filed Jan. 10, 1952
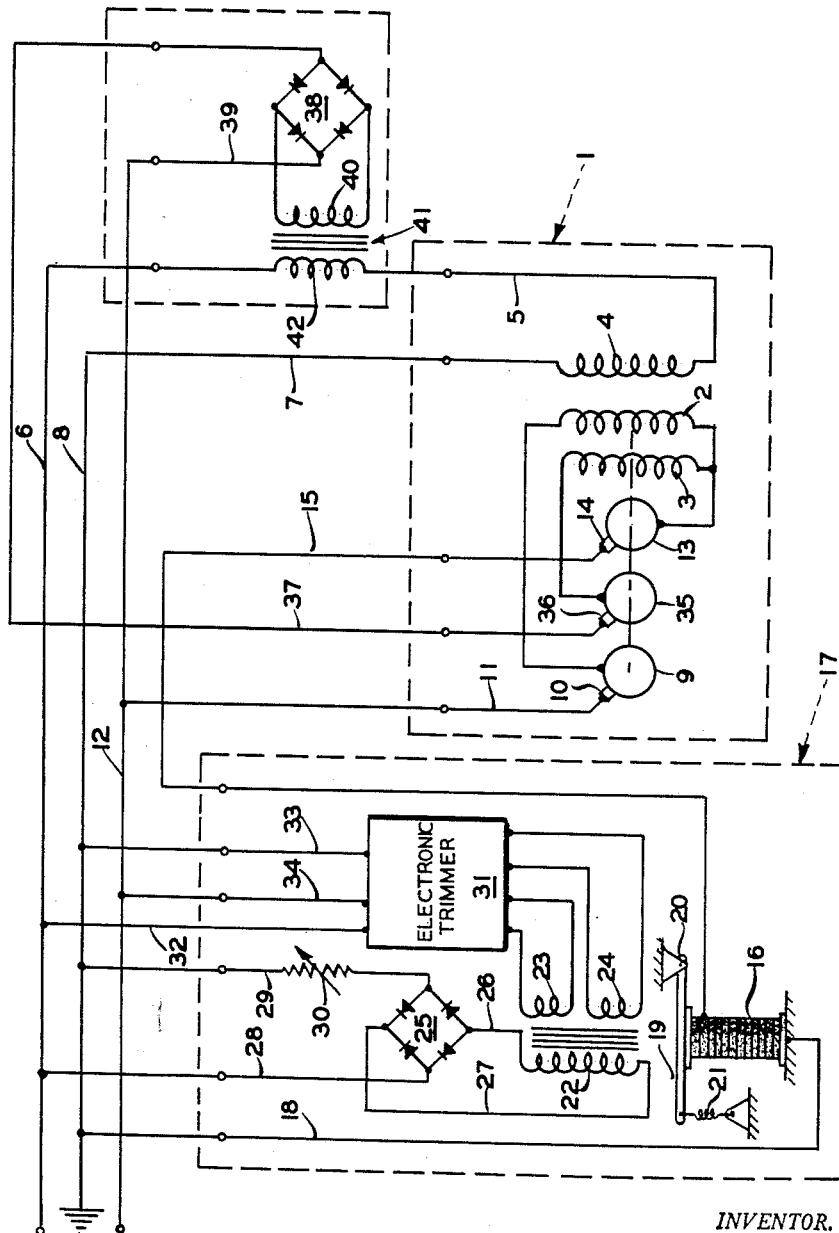
INVENTOR.
HAROLD G. HAAS
BY James M. Nickels
ATTORNEY Patented July 6, 1954

2,683,249

UNITED STATES PATENT OFFICE 2,683,249

EXCITATION SYSTEM FOR ALTERNATING CURRENT GENERATORS

Harold G. Haas, Belleville, N. J., assignor to Bendix Aviation Corporation, Teterboro, N. J., a corporation of Delaware Application January 10, 1952, Serial No. 265,858

5 Claims. (Cl. 322—25)

1

The present invention relates to dynamoelectric machines and more particularly to the excitation of dynamoelectric machines.

In alternating current generators, for example, the type used in aircraft, it is the usual practice to have separate regulating and compounding field windings. The regulating field winding is usually energized from a separate D. C. source such as the D. C. bus of the aircraft. The excitation for the compounding field is usually obtained from the output of the generator and is responsive to the load current. This arrangement permits the use of a relatively small voltage regulator to control the output voltage of the generator. However, upon heavy loads being applied the excitation required from the bus exceeds the range of the voltage regulator.

In order to overcome the aforenoted disadvantage, the regulating and compounding field windings are connected in series and are additive when the compounding current produced by the load is applied. In other words, both the regulating and compounding windings are utilized for compounding.

It is an object of the invention to provide improved excitation means for a generator.

Another object of the invention is to provide improved regulation for a dynamoelectric machine.

Another object of the invention is to provide an improved dynamoelectric machine.

Another object of the invention is to provide an improved compounding system for dynamoelectric machines.

These and other objects and features of the invention will appear more fully hereinafter from a consideration of the following description taken in connection with the accompanying drawing wherein one embodiment of the invention is illustrated by way of example.

In the drawing the single figure of the drawing is a schematic diagram of a generator and associated circuits embodying the invention.

Referring now to the drawing, there is illustrated an alternating current generator 1 having a regulating field winding 2, a compounding field winding 3 and a stator armature winding 4. The generator 1 may be driven from any suitable source such as from the engine of an aircraft (not shown).

One end of the winding 4 is connected by output conductor 5 to A. C. bus 6. The other side of the winding 4 is connected by conductor 7 to ground bus 8. It is understood however that the bus 8 may not be grounded inasmuch as the system could be ungrounded.

2

One end of the regulating winding 2 is connected to slip ring 9 which in turn is connected by brush 10 and conductor 11 to positive D. C. bus 12. The other end of the winding 2 is connected to slip ring 13 which in turn is connected by brush 14 and conductor 15 to one end of a carbon pile element 16 of a regulator 17. The other end of the carbon pile element 16 is connected by conductor 18 to the grounded bus 8.

The regulator 17 is shown diagrammatically as including an armature 19, pivoted at 20 and exerting a compressive force upon the carbon pile 16 under the tension of a spring 21. The spring 21 is arranged so as to balance the pull on the armature 19 by electromagnetic windings 22, 23 and 24 for a predetermined output. The winding 22 is connected across the output of a rectifier 25 by conductors 26 and 27. One input terminal of the rectifier 25 is connected by a conductor 28 to the A. C. bus 6. The other input terminal of the rectifier 25 is connected by a conductor 29 to the grounded bus 8. A variable resistor 30 may be inserted in the conductor 29 to permit adjustment of the winding 22.

The windings 23 and 24 are connected to the output of an electronic trimmer 31. The electronic trimmer 31 may be of the type described and claimed in application Serial No. 690,459 of John F. Emerson filed August 14, 1946, and assigned to Bendix Aviation Corporation. This application has now matured as Patent No. 2,611,121 issued September 16, 1952. The input of the trimmer 31 is connected by conductors 32 and 33 across the AC output of the generator 1. B+ for the trimmer 31 is obtained from the D. C. bus 12 through conductor 34.

One end of the winding 3 is connected to the end of the winding 2 adjacent the slip ring 13. The other end of the winding 3 is connected by slip ring 35, brush 36 and conductor 37 to one of the output terminals of rectifier 38. The other output terminal of the rectifier 38 is connected by a conductor 39 to the positive bus 12. The input of the rectifier 38 is connected across secondary winding 40 of current transformer 41. The transformer 41 has a primary winding 42 in series with the conductor 5.

In operation the no load excitation is obtained from the D. C. bus. Also, the carbon pile element 16 is connected in series with the winding 2 and is responsive to the output of the generator to maintain the output voltage at the desired value. The current transformer 41 located in the A. C. output line of the generator supplies a compounding current that is proportional to the load. The windings 2 and 3 are arranged so that they are connected in series across the rectifier 38 and are additive when the compound current produced by the load is applied thereto. This arrangement permits the carbon pile regulator to work over a smaller range as the increase in excitation current required by the load is furnished by the compounding current across the two windings. In other words, additional ampere turns are supplied by the energization of the regulator winding by the compounding source which reduces the requirement from the bus through the carbon pile element.

While a single phase system has been illustrated, it is understood that the arrangement is also applicable to a multi-phase system as well.

Although only one embodiment of the invention has been illustrated and described, various changes in the form and relative arrangement of the parts may be made to suit requirements.

What is claimed is:

1. An excitation system for an alternating current generator having a pair of field windings, an output winding coupled to a load circuit; comprising an independent source of direct current connected to one of said field windings, a current transformer in series with said load, and rectifier means connecting the output of said current transformer in series with both of said field windings.

2. An excitation system for an alternating current generator having an excitation winding and an output winding coupled to a load circuit, comprising an independent source of direct current, means including a variable resistance element for connecting a portion of said excitation winding across said independent direct current source, a current transformer in series with said load circuit, and means including a rectifier for connecting the output of said current transformer across said excitation winding.

3. An excitation system for a generator having a regulating field winding, a compounding field winding and output windings coupled to a load circuit, comprising a source of substantially constant direct current, means including a variable resistance element for connecting said regulating winding across said constant direct current, means responsive to the output voltage of said output winding for varying said resistance element to maintain said voltage substantially constant, current responsive means connected in said output circuit to produce an output as a function of said current, and means for connecting both of said field windings in series across said last mentioned output.

4. An excitation system for a dynamoelectric machine having a regulating winding, a compensating winding and an output winding, comprising a source of substantially constant voltage, means including a variable resistance element for connecting said regulating winding across said constant voltage source, means responsive to the output of said machine to vary said resistance element to maintain said output at a predetermined value, means responsive to the current in said output winding to produce a voltage proportional to said current, and means for connecting said compensating and regulating windings in series across said last voltage means.

5. A voltage regulating system for a generator having a regulating field winding, a compounding field winding and an output winding connected to a load, comprising a source of substantially constant potential for exciting said regulating field winding, voltage regulating means responsive to the voltage across said output winding for varying the excitation of said regulating field winding, and means including a current transformer in series with said load for producing a potential proportional to said load current for exciting both of said field windings to maintain said output substantially constant upon change in said load.

References Cited in the file of this patent

UNITED STATES PATENTS

| Number | Name | Date |
|---|---|---|
| 2,303,229 | Park | Nov. 24, 1942 |
| 2,611,121 | Emerson | Sept. 16, 1952 |